US008582086B2

(12) United States Patent
Hartman et al.

(10) Patent No.: US 8,582,086 B2
(45) Date of Patent: Nov. 12, 2013

(54) RANGE MEASUREMENT DEVICE

(75) Inventors: Randolph G. Hartman, Plymouth, MN (US); Michael R. Elgersma, Plymouth, MN (US)

(73) Assignee: Honeywell International Inc., Morristown, NJ (US)

(*) Notice: Subject to any disclaimer, the term of this patent is extended or adjusted under 35 U.S.C. 154(b) by 408 days.

(21) Appl. No.: 12/942,689

(22) Filed: Nov. 9, 2010

(65) Prior Publication Data

US 2011/0051120 A1 Mar. 3, 2011

Related U.S. Application Data

(62) Division of application No. 11/837,868, filed on Aug. 13, 2007, now Pat. No. 7,852,463.

(51) Int. Cl.
*G01C 3/08* (2006.01)

(52) U.S. Cl.
USPC .......... 356/5.01; 356/3.01; 356/4.01; 356/5.1

(58) Field of Classification Search
USPC ............. 356/3.01–3.15, 4.01–4.1, 5.01–5.15, 356/6–22, 28, 28.5, 139.01–139.1
See application file for complete search history.

(56) References Cited

U.S. PATENT DOCUMENTS

| 4,937,751 | A | 6/1990 | Nimura et al. |
| 5,661,650 | A | 8/1997 | Sekine et al. |
| 5,680,306 | A | 10/1997 | Shin et al. |
| 5,680,313 | A | 10/1997 | Whittaker et al. |
| 5,684,696 | A | 11/1997 | Rao et al. |
| 5,724,123 | A | 3/1998 | Tanaka |
| 5,838,562 | A | 11/1998 | Gudat et al. |
| 5,956,250 | A | 9/1999 | Gudat et al. |
| 6,204,916 | B1 * | 3/2001 | Norita et al. ............... 356/141.1 |
| 6,249,743 | B1 | 6/2001 | Ohshimo |
| 6,445,983 | B1 | 9/2002 | Dickson et al. |
| 6,502,033 | B1 | 12/2002 | Phuyal |

(Continued)

FOREIGN PATENT DOCUMENTS

| JP | 2000161918 | 6/2000 |
| JP | 2006079325 | 3/2006 |

OTHER PUBLICATIONS

European Patent Office, "Office Action After Consultation", "from Foreign Counterpart of U.S. Appl. No. 11/837,868", Mar. 19, 2013, pp. 13, Published in: EP.

(Continued)

*Primary Examiner* — Luke Ratcliffe
(74) *Attorney, Agent, or Firm* — Fogg & Powers LLC

(57) ABSTRACT

A range measurement device is disclosed. The device comprises a flash laser radar configured to produce a first laser pulse at a first time. The device receives, at a second time, reflections of the first laser pulse from at least one object within a 360 degree field of view. The device further comprises a timing electronics module, an image sensor in communication with the timing electronics module, a mirror element coupled between the image sensor and the laser radar, and a lens. The mirror element includes a first reflector configured to disperse the reflections of the first laser pulse within at least a portion of the 360 degree field of view and a second reflector configured to collect returning reflections of the first laser pulse from the at least one object into the image sensor. The lens is configured to focus the returning reflections onto the image sensor.

20 Claims, 5 Drawing Sheets

(56) References Cited

U.S. PATENT DOCUMENTS

| | | |
|---|---|---|
| 6,853,906 B1 | 2/2005 | Michi et al. |
| 7,211,980 B1 | 5/2007 | Bruemmer et al. |
| 2002/0060784 A1* | 5/2002 | Pack et al. .................. 356/6 |
| 2006/0190124 A1 | 8/2006 | Makela |
| 2006/0197938 A1 | 9/2006 | Halmos et al. |
| 2007/0219720 A1 | 9/2007 | Trepagnier et al. |

OTHER PUBLICATIONS

European Patent Office, "European Search Report", Mar. 4, 2011, Published in: EP.

Advanced Scientific Concepts Inc., "Portable 3D Camera", 2006.

Stettner, Roger et al., "Three Dimensional Flash Ladar Focal Planes and Time Dependent Imaging", Aug. 29, 2006, pp. 15, Publisher: Advanced Scientific Concepts, Inc., Published in: Santa Barbara, California.

Japan Patent Office, "Reason for Rejection", "from Foreign Counterpart of U.S. Appl. No. 12/942,689", Dec. 13, 2012, pp. 14, Published in: JP.

European Patent Office, "Office Action", "from Foreign Counterpart of U.S. Appl. No. 11/837,868", Jul. 2, 2013, pp. 14, Published in: EP.

\* cited by examiner

RANGE MEASUREMENT DEVICE

This application is a divisional application of U.S. application Ser. No. 11/837,868, filed on Aug. 13, 2007, the disclosure of which is incorporated herein by reference.

This application is also related to commonly assigned and co-pending U.S. application Ser. No. 11/678,313, filed on Feb. 23, 2007, published as US 2008/0208455 A1, the disclosure of which is incorporated herein by reference.

BACKGROUND

Many navigation applications provide precise locating and tracking of objects when necessary. For example, unmanned vehicles, such as an unmanned ground vehicle (UGV), require accurate position information in order to properly navigate an area. Most of these navigation applications employ one or more global positioning system (GPS) sensors to achieve a necessary level of precision.

The use of GPS, however, has some limitations. For example, the GPS signals may not be available in a desired location where satellite communication is blocked or scrambled. In addition, the GPS sensors do not obtain any local features of the area (for example, any additional surrounding objects or landmarks within the area) relative to the location of the vehicle. To date, tracking any localized features requires additional synchronization time in instances where accurate measurements within a minimal time period are critical.

For the reasons stated above and for other reasons stated below which will become apparent to those skilled in the art upon reading and understanding the present specification, there is a need in the art for improvements in range measurements and object position tracking.

SUMMARY

The following specification discusses a range measurement device. This summary is made by way of example and not by way of limitation. It is merely provided to aid the reader in understanding some aspects of at least one embodiment described in the following specification.

Particularly, in one embodiment, a range measurement device is provided. The device comprises a flash laser radar configured to produce a first laser pulse at a first time. The device receives, at a second time, reflections of the first laser pulse from at least one object within a 360 degree field of view. The device further comprises a timing electronics module, an image sensor in communication with the timing electronics module, a mirror element coupled between the image sensor and the laser radar, and a lens. The mirror element includes a first reflector configured to disperse the reflections of the first laser pulse within at least a portion of the 360 degree field of view and a second reflector configured to collect returning reflections of the first laser pulse from the at least one object into the image sensor. The lens is configured to focus the returning reflections onto the image sensor.

DRAWINGS

These and other features, aspects, and advantages are better understood with regard to the following description, appended claims, and accompanying drawings where:

The various described features are drawn to emphasize features relevant to the teachings of the present application. Like reference characters denote like elements throughout the figures and text of the specification.

DETAILED DESCRIPTION

Embodiments of the present invention relate to a range measurement device that determines an absolute location and attitude of the system with respect to local objects with absolute known locations (referred to herein as targeted objects) and, in at least one alternate application, a relative location and attitude of the system with respect to any local objects within range of the range measurement device (referred to herein as surrounding objects). In one embodiment, the range measurement device discussed herein determines the location of the system using a pulse from a laser radar (LADAR). Moreover, the range measurement device provides synchronized measurements of the surrounding objects within a 360° field of view along the horizon and returns the distance and angular relationship between the range measurement device and the surrounding objects. With these distance and angular relationships, a location and attitude of the system is determined within a localized area with respect to the surrounding objects. In one implementation, the range measurement device mounts on an unmanned ground vehicle (UGV) interested in at least one of recording an absolute location of the UGV, tracking another vehicle or object within the localized area, and determining a relative location and attitude of the UGV within the localized area.

The use of a LADAR improves range tracking accuracy. The range measurement device discussed here measures an accurate range as well as the angular relationship of the surrounding objects relative to the range measurement device. In one implementation, range, location, and azimuth measurements of the surrounding objects are synchronously measured to a plurality of three-dimensional (3-D) images using the LADAR output. The accurate range measurements are used to locate the device either absolutely or relatively (which is useful in 3-D rendering and mapping applications and allows for localization and mapping in a single process).

In one implementation, the LADAR produces a laser pulse and a charge-coupled device (CCD) sensitive to the laser pulse receives at least one reflection from the surrounding objects "of interest." Based on the reflection(s) received, the CCD can measure a flight time of the laser pulse. In the same and at least one alternate implementation, measurements from the CCD are used by a processor in the range measurement device to determine the location of the UGV relative to any of the surrounding objects identified. Moreover, given the absolute location of the UGV, location coordinates (for example, latitude, longitude, and altitude) of the object are produced. Likewise, the 3-D information can be used to determine the attitude of the object (for example, heading pitch and roll).

Figure 1:
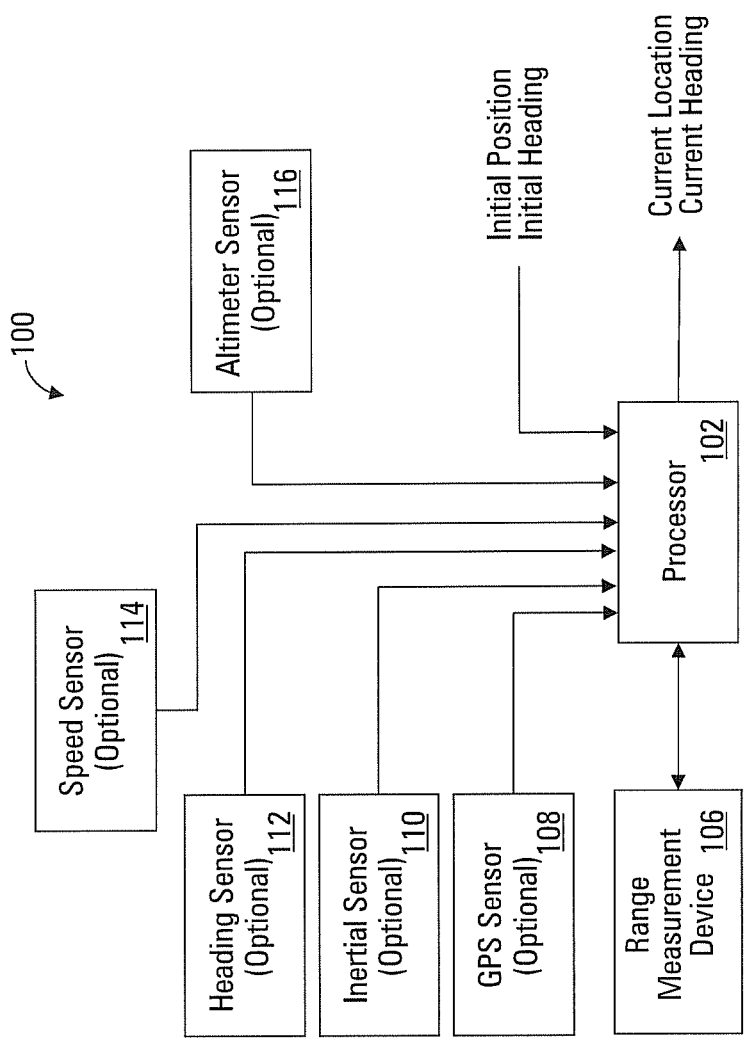
FIG. 1 is a block diagram of a navigation system.

FIG. 1 is a block diagram of a navigation system 100. As illustrated, the navigation system 100 includes a processor 102 that is in communication with a range measurement device 106 (which, in this embodiment, comprises a 360° 3-D flash LADAR). In some embodiments, the system 100 includes at least one additional sensor such as a GPS sensor 108, an inertial sensor 110, a heading sensor 112, a speed sensor 114, and an altimeter sensor 116.

The range measurement device 106 provides range data, including distances and angles, to the processor 102 of objects near a host vehicle having the system 100. Many methods of communication are possible including CCD pixel information, however, one skilled in the art can determine methods for providing distance and angle information. As indicated above, in one embodiment, a 360° 3-D flash LADAR is used in the range measurement device 106. The LADAR-based range measurement device 106 detects and locates the objects using a single flash of laser light and provides information similar to radar. Moreover, the range measurement device 106 illuminates a 360° field of view so that objects in any direction along the horizon from the range measurement device 106 are located (for example, located as the host vehicle traverses throughout an area, similar to the area discussed below with respect to FIG. 2). As the host vehicle passes through the area, the range measurement device 106 tracks individual angles and ranges between the objects and the range measurement device 106 (for example, relative distance data). When absolute position information for the objects is known, the relative distance data can be transformed to Earth-referenced angles for the objects in a specified area (for example, relative distance data). Both the relative and absolute distance data are processed in the processor 102.

In the embodiment that includes the inertial sensor 110, additional information is provided to the processor 102 to estimate the location of the host vehicle. Generally, the inertial sensor 110 estimates a present position based on a prior knowledge of time, initial position, initial velocity, initial orientation without the aid of external information. As illustrated in FIG. 1, an initial position input and an initial heading input is provided. The information generated by the inertial sensor 110 (in this embodiment) is provided to the processor 102. The processor 102 uses the inertial sensor 110 data, in combination with the distance and angle data, from the ranging device 106 to determine the current location of the host vehicle. The current location and current heading is output as illustrated in FIG. 1. The output of the current heading and current location is used to position the system 100 with both absolute and relative navigation coordinates.

Figure 2:
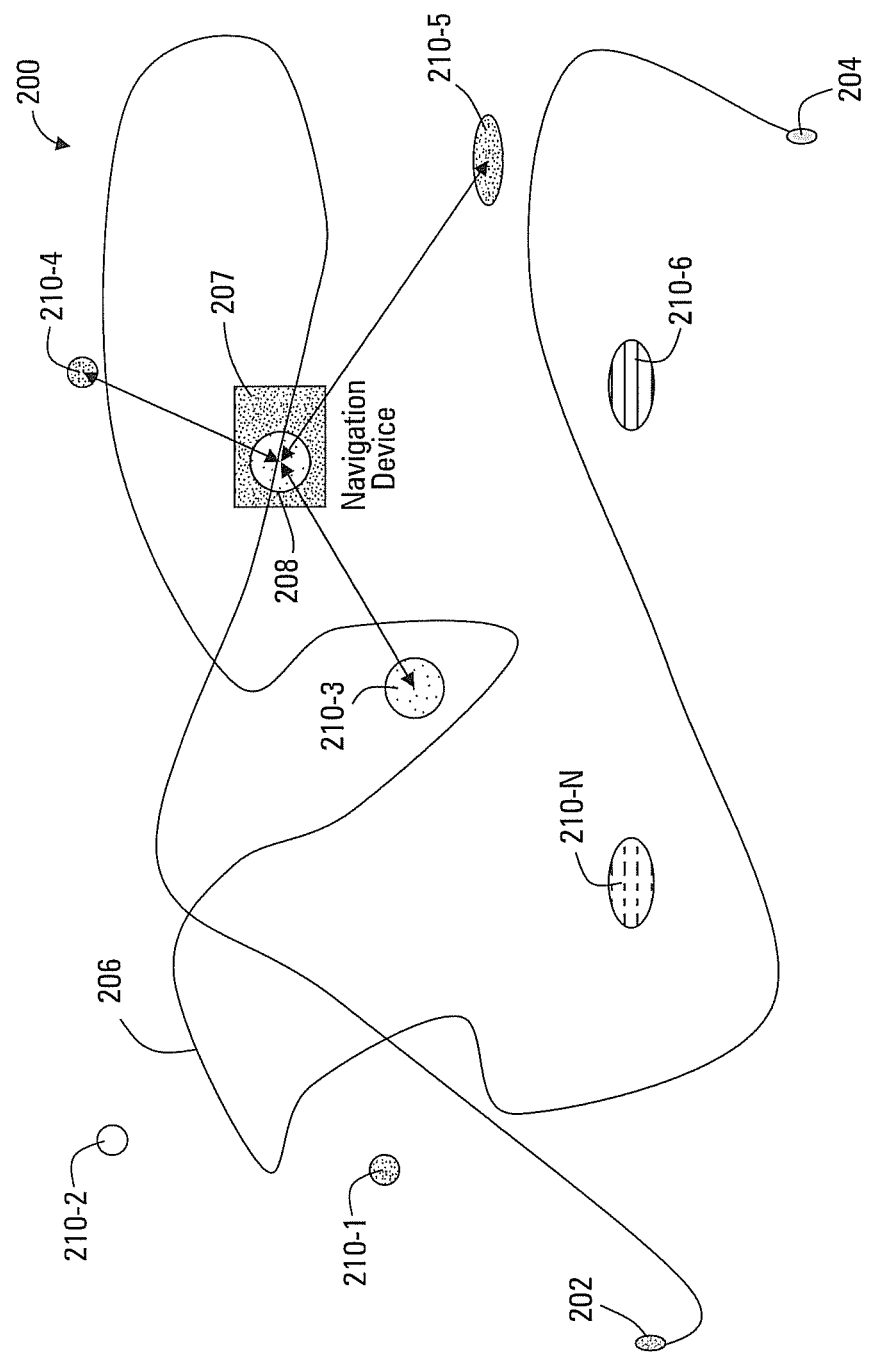
FIG. 2 is a traverse diagram of a vehicle having the system of FIG. 1 traversing through an area.

FIG. 2 is a traverse diagram 200 illustrating a host vehicle 207 (for example, a UGV) passing through an area 200 to be traversed. As illustrated, the area 200 to be traversed includes objects $210_1$ through $210_N$. In one implementation, the objects $210_1$ through $210_N$ are mapped (for example, previously located) according to a correlation position determination method as disclosed in the '313 application. In alternate implementations, locations of the objects $210_1$ through $210_N$ are not previously known. The host vehicle 207 takes a path 206 that starts at a first point 202 and ends at a second point 204. The host vehicle 207 comprises a navigation system 208 including the range measurement device 106 of FIG. 1. In the example embodiment of FIG. 2, the range measurement device 106 of the navigation system 208 transmits (for example, flashes a laser light pulse from a flash LADAR) and receives a 3-D image of the objects 210 through the use of a mirror element and an image sensor, as further described below with respect to FIG. 3.

Figure 3:
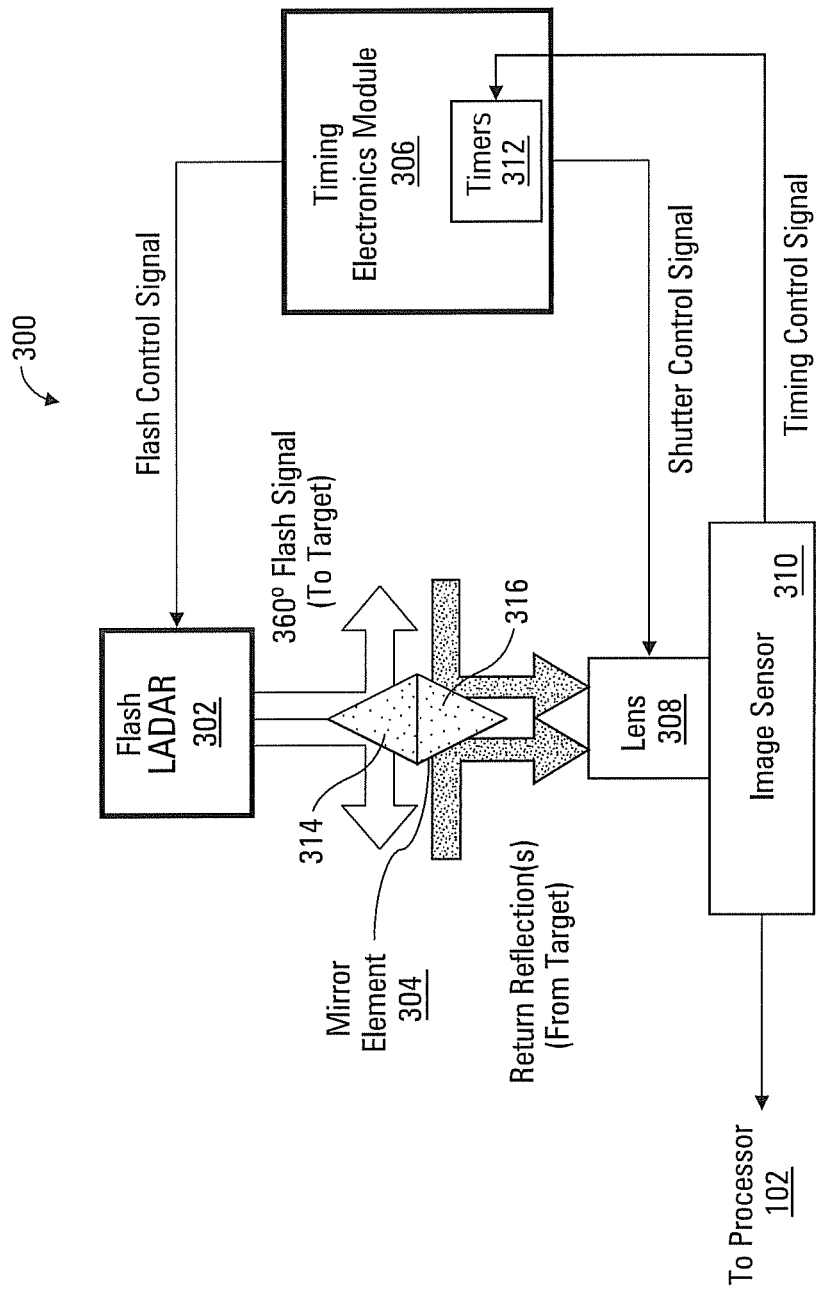
FIG. 3 is a block diagram of a range measurement device.

FIG. 3 is a block diagram of a range measurement device 300. In the example embodiment of FIG. 3, the device 300 represents the range measurement device 106 of FIG. 1. The device 300 in this embodiment comprises a flash laser radar (LADAR) 302, a mirror element 304 (comprising a first reflector 314 and a second reflector 316), and a timing electronics module 306 in communication with the image sensor 310 and a lens 308. In the example embodiment of FIG. 3, the timing electronics module 306 monitors sensitivity of the image sensor 310 by controlling a shutter of the lens 308 with a "Shutter Control Signal" communication link. Moreover, the timing electronics module 306 controls the initiation of a first laser pulse originating from the flash LADAR 302 to illuminate a target (for example, the objects 210 of FIG. 2) with a "Flash Control Signal" communication link. In one implementation, the timing electronics modules 306 further comprises one or more timers 312 operable to measure signal transit timing of the first laser pulse with a "Timing Control Signal" communication link as shown in FIG. 3.

In the example embodiment of FIG. 3, the image sensor 310 is a charge-coupled device (CCD). The image sensor 310 consists of an integrated circuit containing an array of linked, or coupled, light-sensitive capacitors (that is, pixels). In one implementation, the mirror element 304 is a 3-D reflective surface. Moreover, the first reflector 314 is one of a cone, a trapezoid, a sphere, or any other surface which can disperse the first laser pulse into the required field, and the second reflector 316 is one of a cone, a trapezoid, a sphere, or any other surface which can focus a first reflected laser pulse into the lens 308, as further discussed below. The image sensor 310 contains at least one pixel grid array to sense the returned 3-D reflections from the mirror element 304. As discussed in further detail below, the image sensor 310 further provides the intensity of the reflection to the processor 102 and terminates the signal transit timing in the timing electronics module 306.

In operation, the flash LADAR 302 illuminates the objects 210 surrounding the device 300 in a 360° radius through a reflective surface (for example, the mirror element 304). In one implementation, the first reflector 314 is configured to disperse reflections of a first laser pulse into a 360° field of view. The second reflector 316 collects returning laser pulse reflections of the first laser pulse onto the lens 308. In one or more alternate implementations, at least a portion of the field of view less than 360° can be selected. For example, the first laser pulse from the flash LADAR 302 reflects in all directions (that is, the first laser pulse reflects 360°) from the first reflector 314 and returns the reflections back from the objects 210 to the second reflector 316. In turn, the lens 308 focuses the return reflections from the second reflector 316 on a focal plane of the image sensor 310. From the return reflection(s) of the second reflector 316, the lens 308 captures an image of at least one of the objects 210 for the image sensor 310. In the example embodiment of FIG. 3, the focused reflection captured by the lens 308 causes each capacitor in the pixel array of the image sensor 310 to accumulate an electric charge proportional to the light intensity at the location of each of the objects 210.

Using the pixel intensity locations from the image sensor 310, relative angular measurements of each of the objects 210 are taken by the processor 102. A local distance between the flash LADAR 302 and the surrounding objects 210 is also determined given a propagation time of the flash LADAR 302 from flash to reception taken at each pixel of the image sensor 310. A relative range for each of the objects 210 is computed given the local distance and a relative velocity (for example, the speed of light) of the first laser pulse return reflections. The relative range is calculated based on the length of time it takes for the light (for example, the first laser pulse) to return from the target.

Using the relative angular and range information, a 3-D image is created. In one embodiment, once the lens 308 receives the reflection image, independent pixels within the image sensor 310 stop the timers 312 of the timing electronics module 306. The image sensor 310 measures the change in light intensity to stop the signal transit timing (initiated at the time the "Flash Control Signal" is sent from the timing electronics module 306 to the flash LADAR 302) to determine the relative range to each of the objects 210 for each illuminated pixel in the image sensor 310. The propagation time between initializing the first laser pulse and the received reflection image is proportional to the range from the range measurement device 300 to the objects 210 based on the relative velocity of the first laser pulse return reflections. In one implementation, range, location, and azimuth measurements of the objects 210 are synchronized to each 3-D image produced.

In one implementation, given the relative angles and distances discussed above, the host vehicle 207 (of FIG. 2) is localized with as few as two measurements. Moreover, the laser pulses available with the flash LADAR 302 increase the measurement accuracy of the range measurement device 300. In one implementation, any potential objects of interest are localized relative to the host vehicle 207 with the range measurement device 300 as discussed below.

Localized Navigation Based on LADAR Range Data

In the example embodiments of FIGS. 2 and 3, accurately measured ranges are used to locate the host vehicle 207 to at least four objects 210 previously surveyed. In identifying the at least four surveyed objects 210 as targeted objects, each pixel on the image sensor 310 records range to whatever illuminated that pixel. In one implementation, only pixels with very strong returns are considered since those pixels will correspond to reflective surveyed markers present on the at least four surveyed objects 210. It is understood that many means exist for identifying the targeted objects 210 that are well known in the art. In one implementation, a first pixel coordinate (i,j) in (for example) a 128×128 pixel layer CCD in the image sensor 310 provides an estimate of a unit-vector towards at least one of the objects 210 that illuminated the first pixel at (i, j). Together, the range and unit vector provide a first estimate of the targeted object 210's location in polar coordinates. Additionally, this first estimate identifies which of the at least four (surveyed) objects 210 is illuminating the first pixel. In the example embodiment of FIG. 2 (given the surveyed ranges of the targeted objects 210), an accurate estimate of the location of the host vehicle 207 is determined with Equations 1 to 6 described below, where subtracting two range equations (for example, Equations 1 and 2) eliminates the unknown quadratic terms and results in a linear equation (for example, Equation 3).

In one implementation, Equations 1 and 2 illustrated below use Cartesian grid coordinates $(x_1,y_1,z_1)$ and $(x_2,y_2,z_2)$ for the location of the objects 210$_1$ and 210$_2$ at two known locations, and a first unknown position $(x_0,y_0,z_0)$, with measured ranges of $r_1$ and $r_2$ from the range measurement device 300 to the objects 210$_1$ and 210$_2$.

$$(x_0-x_1)^2+(y_0-y_1)^2+(z_0-z_1)^2-r_1^2=0 \quad \text{Equation 1}$$

$$(x_0-x_2)^2+(y_0-y_2)^2+(z_0-z_2)^2-r_2^2=0 \quad \text{Equation 2}$$

As illustrated above, the only unknown quadratic terms in Equations 1 and 2 are $x_0^2+y_0^2+z_0^2$. By subtracting Equations 1 and 2, all the unknown quadratic terms cancel (for example, Equation 1−Equation 2=0) as illustrated below in Equation 3.

$$2*((x_2,y_2,z_2)-(x_1,y_1,z_1))'*(x_0,y_0,z_0)+r_2^2-r_1^2+\|(x_1,y_1,z_1)\|^2-\|(x_2,y_2,z_2)\|^2=0 \quad \text{Equation 3}$$

Equation 3 as discussed above is a linear equation with unknowns $(x_0,y_0,z_0)$. The symbol $\|\ \|^2$ is defined as illustrated below in Equation 4.

$$\|(x_n,y_n,z_n)\|^2=x_n^2+y_n^2+z_n^2 \text{ where } n=1,2,\ldots \quad \text{Equation 4}$$

In the example embodiment of FIG. 2, the at least four surveyed markers (that is, the objects 210$_1$ to 210$_4$) result in at least six linear equations from the six combinations (for example, (1-2), (1-3), (1-4), (2-3), (2-4) and (3-4)) as shown below:

(Equation 1)−(Equation 2)=0

(Equation 1)−(Equation 3)=0

(Equation 1)−(Equation 4)=0

(Equation 2)−(Equation 3)=0

(Equation 2)−(Equation 4)=0

(Equation 3)−(Equation 4)=0

The above example provides at least 6 linear equations with at least 3 unknowns $(x_0,y_0,z_0)$, which are solved using commonly-known linear algebra and a least squares solution. These equations are written in vector notation as illustrated below in Equation 5, with a least squares solution to $[\hat{x}]$ shown below in Equation 6.

$$[A][x]=[b] \quad \text{Equation 5}$$

$$[\hat{x}]=[A^TA]^{-1}[A^T][b] \quad \text{Equation 6}$$

The result of Equation 6 is a location of the host vehicle 207, $[\hat{x}]$, localized to the targeted objects 210 using the range data of the flash LADAR 302.

Figure 4:
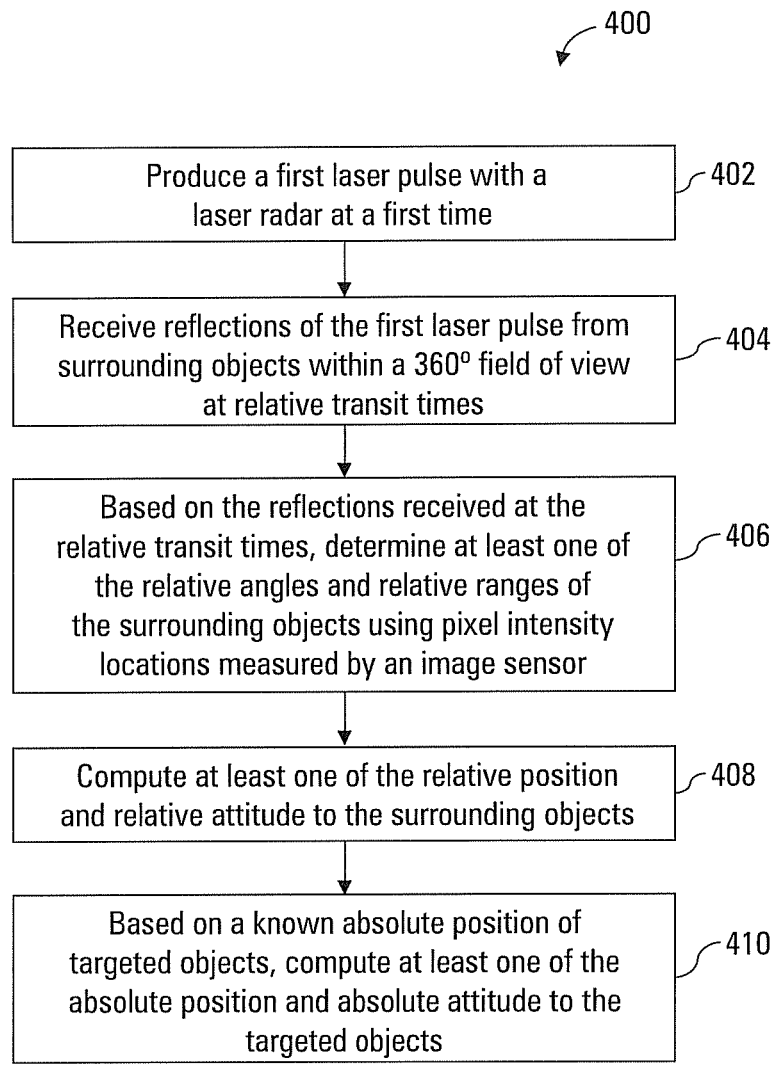
FIG. 4 is a flow diagram of a method for measuring range.

FIG. 4 is a flow diagram of a method 400 for measuring range to determine a laser radar position. For example, the method 400 uses a range measurement device similar to the range measurement device 300 of FIG. 3 to perform 360° range tracking of an area surrounding a vehicle (for example, the host vehicle 207 of FIG. 2). The method discussed here returns the distance and angular relationship between the vehicle and any surrounding objects currently positioned in the area. For example, the range measurement device 300 includes a flash, a mirror element, and a CCD-based image sensor so that the surrounding objects can be detected in a 360° field of view.

At block 402, the range measurement device produces a first laser pulse with the laser radar at a first time dispersed over the 360° field of view. In one implementation, a timing electronics module of the range measurement device controls the initiation of the first laser pulse in order to properly illuminate at least one surrounding object. The range measurement device receives reflections of the first laser pulse reflected from surrounding objects within the 360 degree field of view at a second time (block 404). In one implementation, the second time comprises a relative transit time of the reflected first laser pulse within a localized time period between the first and second times. Based on the reflections received, the range measurement device tracks at least one of a range and an attitude from the vehicle to the at least one surrounding object (block 406). In one implementation, signal transit times between producing the flash pulse to reception at the CCD-based image sensor and pixel intensity locations measured by the CCD-based image sensor are used to determine the relative angles and relative ranges of the surrounding objects.

As additional reflections are received, the range measurement device determines additional localized time periods to determine at least one of a current position and a current attitude of the host vehicle relative to the surrounding objects (block 408). In one implementation, computing performed at block 408 comprises measuring the additional localized time periods to determine a current heading, pitch, and roll of the vehicle. In addition, based on the reflections received and a known absolute position of the targeted objects, the range measurement device determines an absolute position of the vehicle, records at least one relative position angle between the target and the vehicle, and computes at least one of an absolute position and absolute attitude to the targeted objects (block 410).

Figure 5:
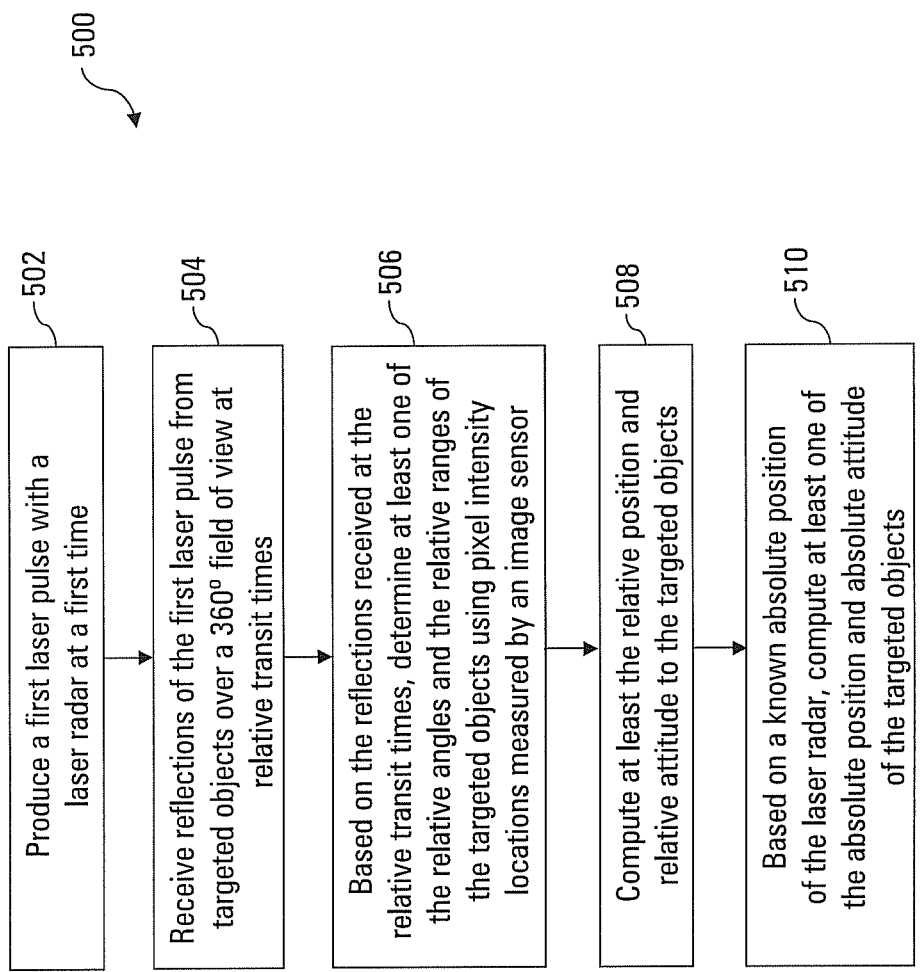
FIG. 5 is a flow diagram of an alternate method for measuring range.

FIG. 5 is a flow diagram of a method 500 for measuring range to determine target positions. For example, the method 500 addresses using a first laser pulse from the range measurement device 300 of FIG. 3 to perform 360° range tracking of an area surrounding a vehicle (for example, the host vehicle 207 of FIG. 2) and returns the distance and angular relationship between the vehicle and any (known) targeted objects currently positioned in the area. The range measurement device used for the method of FIG. 5 includes a flash, a mirror element, and a CCD-based image sensor for the targeted objects of the objects 210 to be detected in a 360° field of view.

At block 502, the range measurement device produces a first laser pulse with the laser radar at a first time dispersed over the 360° field of view. In one implementation, a timing electronics module of the range measurement device controls the initiation of the first laser pulse in order to properly illuminate at least one surrounding object. The range measurement device receives reflections of the first laser pulse from surrounding objects within the 360 degree field of view at a second time (block 504). In one implementation, the second time comprises a relative transit time of the reflected first laser pulse within a localized time period between the first and second times. Based on the reflections received, the range measurement device tracks at least one of a range and an attitude from the vehicle to the at least one surrounding object (block 506). In one implementation, signal transit times between producing the flash pulse to reception at the CCD-based image sensor and pixel intensity locations measured by the CCD-based image sensor are used to determine the relative angles and relative ranges of the targeted objects. As additional reflections are received, the range measurement device determines additional localized time periods to determine at least one of a relative position and relative attitude to the targeted objects (block 508). In addition, based on a known absolute position of the laser radar, the range measurement device computes at least one of an absolute position and absolute attitude to the targeted objects at block 510.

While the embodiments disclosed have been described in the context of a navigational system, apparatus embodying these techniques are capable of being distributed in the form of a machine-readable medium of instructions and a variety of program products that apply equally regardless of the particular type of signal bearing media actually used to carry out the distribution. Examples of machine-readable media include recordable-type media, such as a portable memory device; a hard disk drive (HDD); a random-access memory (RAM); a read-only memory (ROM); transmission-type media, such as digital and analog communications links; and wired (wireless) communications links using transmission forms, such as (for example) radio-frequency (RF) and light wave transmissions. The variety of program products may take the form of coded formats that are decoded for actual use in a particular navigational system incorporating the range measurement device discussed here by a combination of digital electronic circuitry and software (or firmware) residing in a programmable processor (for example, a special-purpose processor or a general-purpose processor in a computer). At least one embodiment can be implemented by computer-executable instructions, such as program product modules, using the programmable processor. The computer-executable instructions, any associated data structures, and the program product modules represent examples of executing the teachings of the present application disclosed herein.

This description has been presented for purposes of illustration, and is not intended to be exhaustive or limited to the embodiments disclosed. Variations and modifications may occur, which fall within the scope of the following claims.

What is claimed is:

1. A navigation system, comprising:
a range measurement device operable to provide at least one of angles, ranges, and attitude data of at least one object, the range measurement device including:
a flash laser radar operable to produce a first laser pulse at a first time;
an image sensor configured to receive, at a second time, reflections of the first laser pulse from the at least one object within a 360 degree field of view of the range measurement device; and
a mirror element located between the image sensor and the flash laser radar, the mirror element including a first reflector surface configured to disperse reflections of the first laser pulse into a 360 degree field of view, and a second reflector surface configured to collect returning reflections of the first laser pulse from the at least one object within the 360 degree field of view into the image sensor; and
a processor in communication with the range measurement device, the processor configured to:
track a range and an attitude based on an output of the range measurement device to the at least one object within a localized time period between the first and second times based on the reflections received from the at least one object;
and
as additional reflections are received from the at least one object, record additional time periods to determine at least one of a current position and a current attitude of the range measurement device relative to the at least one object.

2. The system of claim 1, further comprising at least one of an inertial sensor, a heading sensor, a speed sensor, a global positioning sensor, and an altimeter sensor in communication with the processor.

3. The system of claim 1, wherein the processor further comprises program instructions to determine at least one of an absolute position and an absolute attitude of the system based on the measurements to the at least one object with prior information including at least one known attitude and position.

4. The system of claim 1, wherein the processor further comprises program instructions to determine at least one of a range measurement to the at least one object, an azimuth measurement to the at least one object, and a location measurement of the at least one object.

5. A method for measuring range to determine position, the method comprising:
producing a first laser pulse with a laser radar of a range measurement device, the range measurement device comprising a mirror element and an image sensor, the mirror element including a first reflecting surface and a second reflecting surface;
dispersing reflections of the first laser pulse from the first reflecting surface at a first time into a 360 degree field of view;

receiving reflections of the first laser pulse from at least one object within the 360 degree field of view from the second reflecting surface at the image sensor at a second time;

based on the reflections received at the second time, tracking at least one of a range and an attitude from a host vehicle having the laser radar to the at least one object within a localized time period between the first and second times; and as additional laser pulse reflections are received, recording additional localized time periods to determine at least one of a current position and a current attitude of the host vehicle relative to the at least one object.

6. The method of claim 5, further comprising determining at least one of an absolute position and an absolute attitude of the host vehicle based on the reflections received and a known location of the at least one object.

7. The method of claim 5, further comprising:
synchronizing a range image of the at least one reflection of the first laser pulse with the laser radar at the second time; and
determining a relative velocity between the range measurement device and the at least one object based on a localized time period between the first and second times.

8. The method of claim 7, wherein synchronizing the range image comprises determining at least one of a range measurement to the at least one object, an azimuth measurement to the at least one object, and a location measurement of the at least one object.

9. The method of claim 5, further comprising determining a relative range between the range measurement device and the at least one object.

10. The method of claim 5, wherein receiving the reflections further comprises determining a relative angle between the at least one object and the host vehicle based on relative transit times.

11. The method of claim 5, wherein tracking further comprises:
determining at least one of a relative position and relative attitude of the at least one object within the 360 degree field of view; and
determining at least one of an absolute position and absolute attitude of the at least one object when an absolute position of the laser radar is known.

12. The method of claim 5, wherein tracking further comprises:
determining a relative position angle between the at least one object and the host vehicle, wherein the at least one object is a targeted object;
determining at least a relative position and relative attitude to the targeted object; and
determining at least one of an absolute position and absolute attitude of the targeted object when an absolute position of the laser radar is known.

13. The method of claim 5, wherein recording the additional localized time periods comprises at least one of:
measuring the additional laser pulse reflections to determine a current heading, pitch, and roll of the host vehicle; and
measuring the additional laser pulse reflections to determine a location of a targeted object relative to the host vehicle.

14. A method for measuring range to determine position, the method comprising:
dispersing a first laser pulse from a host vehicle at a first time into a 360 degree field of view;
receiving reflections of the first laser pulse from a plurality of objects within the 360 degree field of view at a second time;
based on the reflections received at the second time, tracking a range and an attitude from the host vehicle to the objects within a localized time period between the first and second times; and
as additional laser pulse reflections are received, recording additional localized time periods to determine a current position and a current attitude of the host vehicle relative to the objects.

15. The method of claim 14, further comprising determining an absolute position and an absolute attitude of the host vehicle based on the reflections received and a known location of the objects.

16. The method of claim 14, further comprising determining a relative range between the host vehicle and the objects.

17. The method of claim 14, wherein receiving the reflections further comprises determining a relative angle between the objects and the host vehicle based on relative transit times.

18. The method of claim 14, wherein tracking further comprises:
determining a relative position and relative attitude of the objects within the 360 degree field of view; and
determining an absolute position and absolute attitude of the objects when an absolute position of the host vehicle is known.

19. The method of claim 14, wherein tracking further comprises:
determining a relative position angle between the objects and the host vehicle, wherein the objects are targeted objects;
determining a relative position and relative attitude to the targeted objects; and
determining an absolute position and absolute attitude of the targeted objects when an absolute position of the host vehicle is known.

20. The method of claim 14, wherein recording the additional localized time periods comprises at least one of:
measuring the additional laser pulse reflections to determine a current heading, pitch, and roll of the host vehicle; and
measuring the additional laser pulse reflections to determine a location of the objects relative to the host vehicle.

* * * * *

UNITED STATES PATENT AND TRADEMARK OFFICE
CERTIFICATE OF CORRECTION

PATENT NO. : 8,582,086 B2  
APPLICATION NO. : 12/942689  
DATED : November 12, 2013  
INVENTOR(S) : Hartman et al.

Page 1 of 1

It is certified that error appears in the above-identified patent and that said Letters Patent is hereby corrected as shown below:

In the Claims

At claim 5, column 8, line 62, replace "comprising a minor element" with --comprising a mirror element--.

Signed and Sealed this
Twenty-seventh Day of May, 2014

Michelle K. Lee
*Deputy Director of the United States Patent and Trademark Office*